United States Patent
Pritchard

(10) Patent No.: US 9,593,725 B2
(45) Date of Patent: Mar. 14, 2017

(54) SELF-ADJUSTING CLUTCH REACTION PLATE

(71) Applicant: BorgWarner Inc., Auburn Hills, MI (US)

(72) Inventor: Larry A. Pritchard, Macomb, MI (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 14/614,729

(22) Filed: Feb. 5, 2015

(65) Prior Publication Data

US 2015/0226274 A1    Aug. 13, 2015

Related U.S. Application Data

(60) Provisional application No. 61/937,255, filed on Feb. 7, 2014.

(51) Int. Cl.

| | |
|---|---|
| *F16D 27/14* | (2006.01) |
| *F16D 48/06* | (2006.01) |
| *F16D 13/75* | (2006.01) |
| *F16D 27/115* | (2006.01) |
| *F16D 13/52* | (2006.01) |

(52) U.S. Cl.
CPC ............. *F16D 27/14* (2013.01); *F16D 48/06* (2013.01); *F16D 13/52* (2013.01); *F16D 13/757* (2013.01); *F16D 27/115* (2013.01); *F16D 2500/1022* (2013.01); *F16D 2500/1045* (2013.01); *F16D 2500/5016* (2013.01); *F16D 2500/50233* (2013.01); *F16D 2500/50275* (2013.01)

(58) Field of Classification Search
CPC ...................... F16D 2500/50233; F16D 13/757
USPC ....................................... 192/111.51
See application file for complete search history.

(56) References Cited

U.S. PATENT DOCUMENTS

| | | | | |
|---|---|---|---|---|
| 3,288,257 | A | * 11/1966 | Ulbing | .................... F16D 27/00 |
| | | | | 192/111.16 |
| 4,099,604 | A | * 7/1978 | Higgerson | ............ F16D 13/757 |
| | | | | 192/111.17 |
| 5,706,924 | A | * 1/1998 | Bacher | .................. F16D 13/757 |
| | | | | 192/111.3 |
| 6,053,296 | A | * 4/2000 | Lopez | .................... F16D 13/70 |
| | | | | 192/111.4 |

(Continued)

*Primary Examiner* — Ramya Burgess
*Assistant Examiner* — Mark Manley
(74) *Attorney, Agent, or Firm* — Young Basile Hanlon & MacFarlane, P.C.

(57) ABSTRACT

A self-adjusting clutch (10) can include an automatic adjustment mechanism (20) for decreasing an axial dimension within a clutch pack (14). The adjustment can compensate for wear of the facing surfaces of interposed members located within the clutch pack (14), resulting from repeated engaging and disengaging under a clutch apply load within the clutch (10). The adjustment mechanism (20) can include a reaction plate (12) normally biased toward the clutch pack (14) by a plurality of first springs (22). The adjustment mechanism (20) can further include a plurality of pawls (24) supported for rotation by the reaction plate (12) and biased by a plurality of second springs (26) toward a locking position with respect to a ring member (36). The plurality of pawls (24) can lock the reaction plate (12) against axial movement in a direction of the clutch apply load during clutch actuation.

14 Claims, 3 Drawing Sheets

(56) References Cited

U.S. PATENT DOCUMENTS

2002/0144875 A1* 10/2002 Dau ................... F16D 13/385
                                                    192/48.8
2011/0192693 A1*  8/2011 Bradley ............... F16D 13/69
                                                    192/48.92

* cited by examiner

SELF-ADJUSTING CLUTCH REACTION PLATE

CROSS-REFERENCE TO RELATED APPLICATIONS

This application claims priority to U.S. Provisional Patent Application Ser. No. 61/937,255, filed Feb. 7, 2014.

FIELD OF THE INVENTION

The invention relates to automatically adjusting clutches, and more particularly to friction clutches having self-adjusting mechanisms for compensating for wear of friction discs.

BACKGROUND

Clutch assemblies can selectively transfer torque from a driving shaft to a driven shaft. Currently employed clutch assemblies can include clutch packs having an array of interposed members. The interposed members can have facing surfaces including friction discs, such that the friction discs can be compressed to engage the clutch. The use of a clutch can result in the wear, lining loss, and compression set of the friction discs, resulting in an unpredictable engagement point of the clutch. The decreased capacity of the clutch can require replacement of the friction discs. Adjustment can be performed manually or automatically by various slack adjusting devices. Current adjusting devices can require complex worm wheel driven configurations which can be expensive to manufacture and assemble. The devices can also lack a direct bearing on the operation of the clutch such that the maximum torque transmitting capacity cannot be controlled. Self-adjusting clutch assemblies have been previously disclosed in U.S. Pat. No. 2,682,942; U.S. Pat. No. 3,458,022; U.S. Pat. No. 3,485,330; U.S. Pat. No. 4,141,441; U.S. Pat. No. 4,263,999; U.S. Pat. No. 4,266,649; U.S. Pat. No. 4,381,053; U.S. Pat. No. 5,456,345; U.S. Pat. No. 5,887,689; French Patent 2,753,503; G.B. Patent No. 744,362; G.B. Patent No. 1,365,613; G.B. Patent No. 2,305,475; E.P. Patent No. 1,568,905; and W.O. Patent Application 2008/138,297.

SUMMARY

Current self-adjusting clutches can require complex configurations to adjust for the wear of clutch friction discs. It would be desirable to provide an automatic adjusting mechanism that can adjust for wear by moving a clutch reaction plate when the self-adjusting clutch changes in axial length.

Current automatic adjustment mechanisms can axially change a positional relationship between friction members of a clutch pack. The clutch pack can include an array of interposed friction members having facing surfaces and a clutch actuation mechanism. The automatic adjustment mechanism can decrease an axial dimension between adjacent members of the array to compensate for wear of the facing surfaces that can occur when the surfaces are repeatedly engaged and disengaged under a clutch apply load within the self-adjusting clutch. The self-adjusting clutch can transmit power using frictionally engaged members of the clutch pack for securing and releasing driving continuity between a driving shaft and a driven shaft. The driving shaft and the driven shaft can be rotatable about a common axis and can support the array of interposed members having facing surfaces spaced along the common axis and co-axial with the shafts. A first set of frictionally engageable members of the array can be constrained to rotate with one of the shafts while a second set of frictionally engaged members of the array can be constrained to rotate with the other shaft. Each of the first and second sets of the frictionally engageable members is movable along the common axis. The clutch actuation mechanism can move members toward one another for mutual engagement of the facing surfaces of the interposed, alternating first and second frictionally engageable members when the clutch is engaged.

The automatic adjustment mechanism can include a reaction plate biased toward the clutch pack. A pawl can act against the reaction plate and be biased to allow movement of the reaction plate in a direction opposite from the clutch apply load. The pawl can lock against movement of the reaction plate in a direction of the clutch apply load.

The automatic adjustment mechanism can include a reaction plate biased toward the clutch pack by a plurality of first springs. A pawl can act against the reaction plate and be biased to allow movement of the reaction plate in a direction opposite from the clutch apply load. The pawl can be biased by a plurality of second springs to allow movement of the reaction plate in the direction opposite from the clutch apply load. The pawl can lock against movement of the reaction plate in a direction of the clutch apply load. A positive spring separation force can be provided having a higher magnitude force than the reaction plate spring force.

A method of assembling an automatic adjustment mechanism can include positioning a reaction plate such that the reaction plate is normally biased toward the clutch pack by a plurality of first springs. The method can further include assembling a pawl for acting against the reaction plate, where the pawl is normally biased to allow movement of the reaction plate in a direction opposite from the clutch apply load by a plurality of second springs. The pawl can lock against movement in a direction of the clutch apply load. The method can further include providing a positive spring separation force having a higher magnitude force than the reaction plate spring force.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
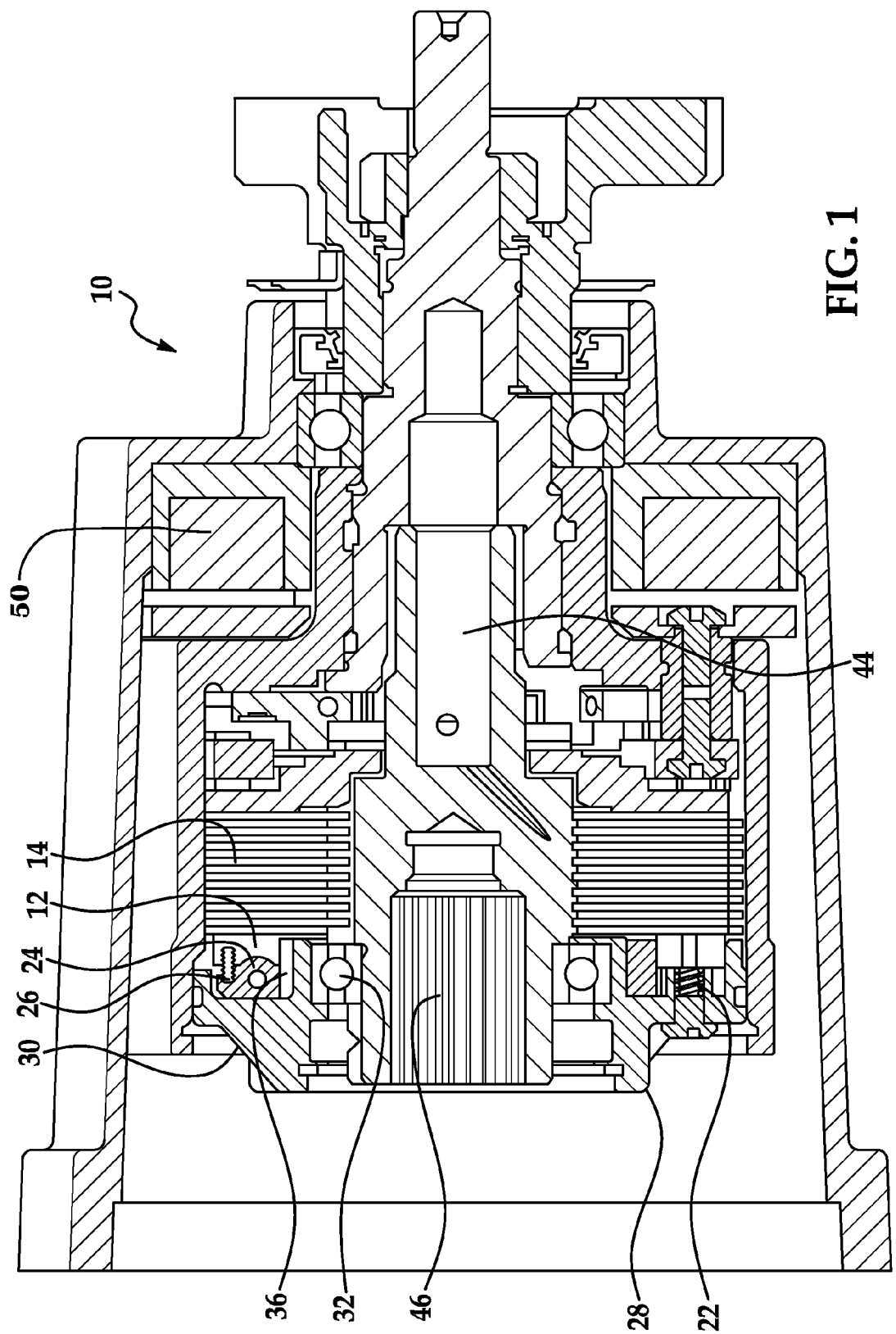
FIG. 1 is a sectional view of a self-adjusting clutch including an automatic adjustment mechanism.

Referring now to FIG. 1, an automatic adjustment mechanism 20 is illustrated for use in a self-adjusting clutch 10. The clutch 10 can include a clutch pack 14 which can be compressible in response to engagement of the clutch 10 for the transfer of torque. The clutch pack 14 can include an array of interposed members having facing surfaces. The clutch pack 14 can include a pressure plate, at least one diaphragm spring, at least one friction disc, or any combination of clutch plates are contemplated to be within the scope of the invention. The interposed members can be rotatable around a common axis. The clutch pack 14 can also include a clutch actuation mechanism for moving the interposed members toward one another for mutual engagement of the facing surfaces when the clutch 10 is engaged. The clutch 10 can be used for transmitting power through the at least one friction disc or other frictionally engaging members of the clutch pack 14 for securing and releasing driving continuity between a driving shaft 44 and a driven shaft 46. As illustrated in FIG. 1, the driving shaft 44 and the driven shaft 46 can be rotatable about the common axis and can support the array of interposed members having facing surfaces spaced along the common axis and co-axial with the shafts 44, 46. Some members of the array can be constrained to rotate with one of the shafts 44 while some members of the array can be constrained to rotate with the other shaft 46, while being movable along the common axis relative to one another.

The automatic adjustment mechanism 20 can axially change a positional relationship between the clutch pack 14 by decreasing an axial dimension between adjacent members of the array. The change in positional relationship can compensate for wear of the facing surfaces resulting from the repeated engagement and disengagement of the interposed members under a clutch apply load. The automatic adjustment mechanism 20 can be used when the clutch 10 is a wet clutch or a dry clutch. The automatic adjustment mechanism 20 can be used in any configuration of a self-adjusting clutch 10 that requires wear compensation or requires a consistent engagement point for operation, such as clutches used in dual-clutch transmissions. The automatic adjustment mechanism 20 can also be an enabler for magnetically applied clutches where the change in length of the clutch pack 14 affects an air gap in the magnetic system. The automatic adjustment mechanism 20 can be used in a self-adjusting clutch 10 where the clutch actuation mechanism is an electromagnetic actuator 50. The automatic adjustment mechanism 20 can also be used in magnetically applied all-wheel drive clutches.

Figure 2:
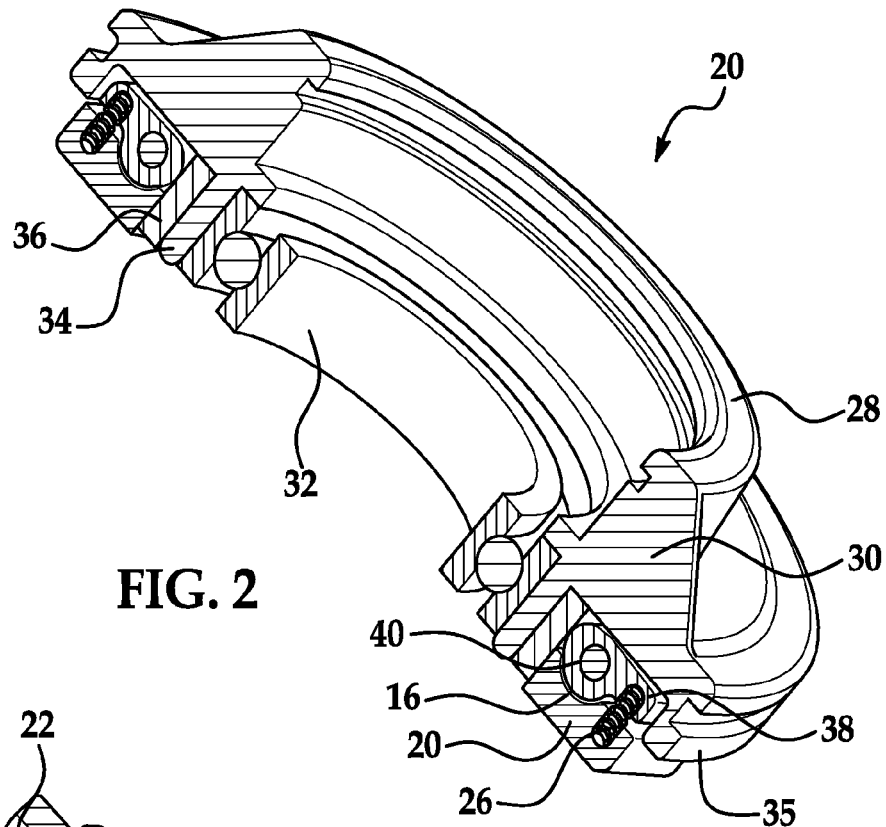
FIG. 2 is a cross sectional view of an automatic adjustment mechanism illustrating the pawl and the plurality of second springs taken as shown in FIG. 4.
Figure 3:
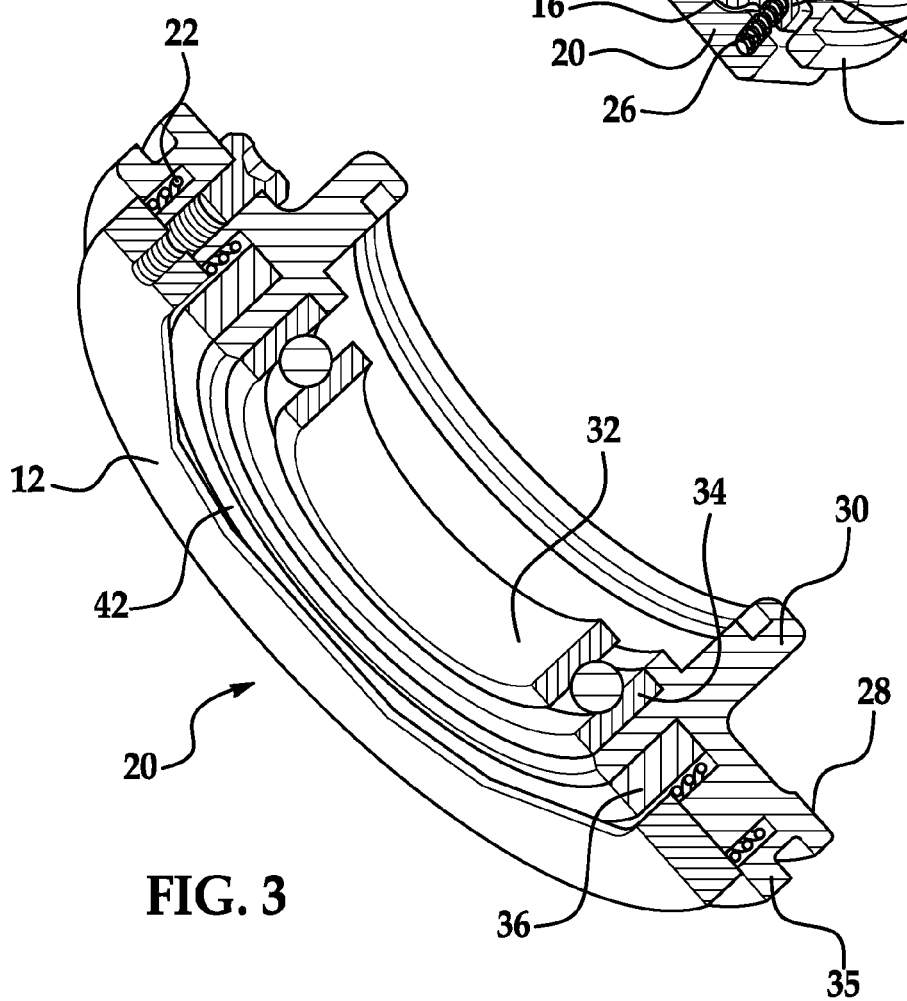
FIG. 3 is a cross sectional view of an automatic adjustment mechanism illustrating the reaction plate and the plurality of first springs taken as shown in FIG. 4.
Figure 4:
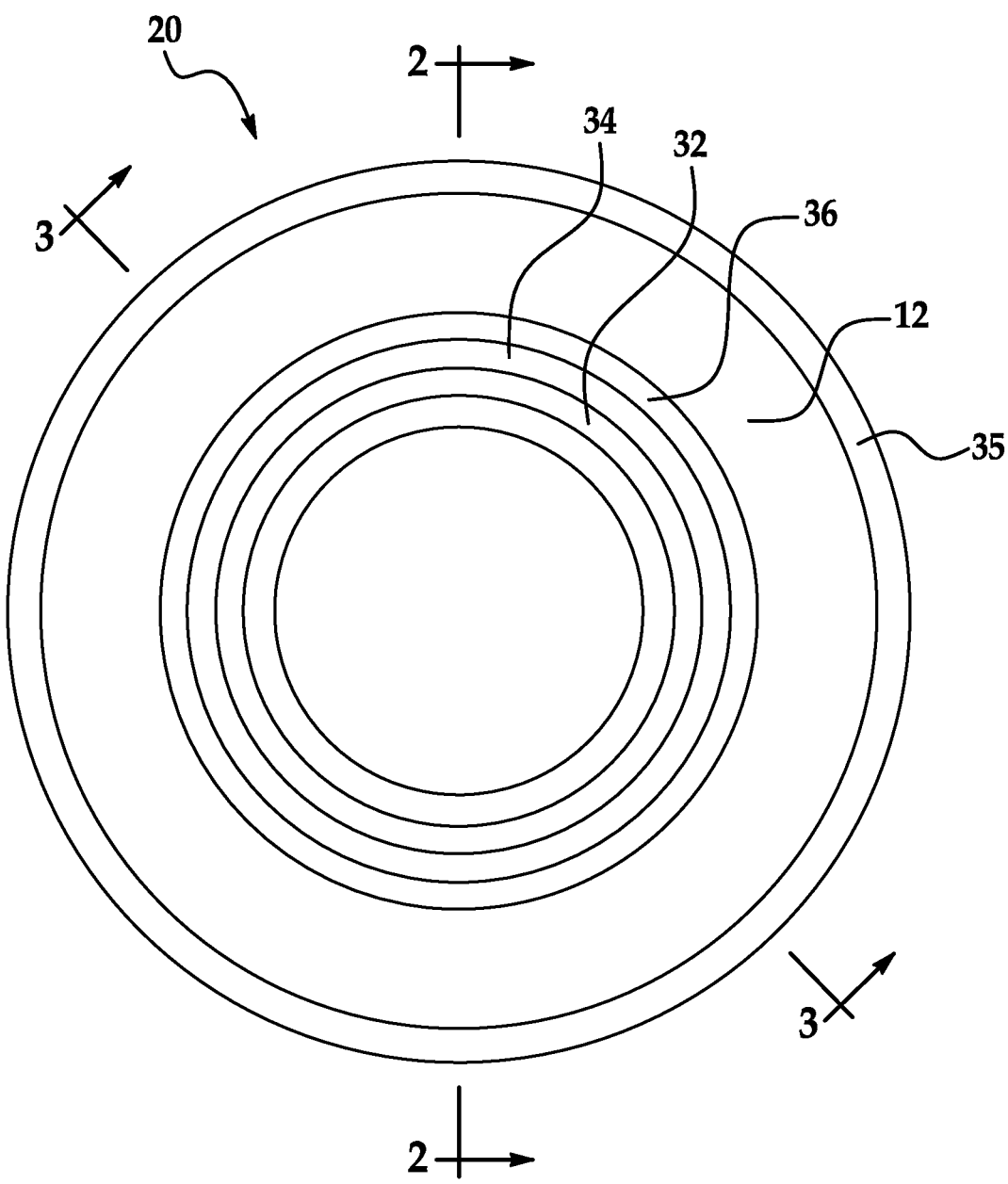
FIG. 4 is a simplified schematic end view of an automatic adjustment mechanism, illustrating the cross sections taken for FIGS. 2 and 3.

Referring now to FIGS. 2-4, an automatic adjustment mechanism 20 is illustrated. As illustrated in FIG. 4, FIGS. 2 and 3 are cross sections of the automatic adjustment mechanism 20 taken at different angular orientations with respect to the rotational axis of the adjustment mechanism 20 and shown relative to an end face of a back plate 28. During disengagement of the clutch 10, the adjustment mechanism 20 can be adapted to mechanically adjust for the slack or degree of wear of the interposed members located within the clutch pack 14 by allowing movement of a reaction plate 12 in a non-clutch load direction changing a dimension of a gap between the reaction plate 12 and the interposed members of the clutch pack 14 from when the clutch 10 is engaged, thereby allowing the gap to be diminished when the gap dimension is greater than a desired tolerance. The adjustment mechanism 20 can include the reaction plate 12, a plurality of first springs 22, a plurality of pawls 24, and a plurality of second springs 26. The reaction plate 12 can be engageable with the clutch pack 14 during engagement of the clutch 10. The plurality of pawls 24 can be mounted to the reaction plate 12. The self-adjusting clutch 10 can include the back plate 28 supporting the reaction plate 12 for engagement with the clutch pack 14.

The back plate 28 can include a back plate housing 30 for supporting the adjustment mechanism 20. The back plate housing 30 can have an inner wall 34 and an outer wall 35. The automatic adjustment mechanism 20 can be radially located between the inner wall 34 and the outer wall 35. The back plate 28 can also include a bearing sleeve 32 which can be radially located within the inner wall 34 of the back plate housing 30. As best illustrated in FIG. 1, the bearing sleeve 32 can be located along the common axis and can receive the driven shaft 46. The driven shaft 46 can be splined. The back plate 28 can also include a ring member 36 axially engageable between the inner wall 34 and the automatic adjusting mechanism 20. The ring member 36 can be a cylindrical sleeve. The plurality of pawls 24 can be identical to one another and can be disposed at circumferentially angularly spaced locations about the common axis and located axially between the reaction plate 12 and the back plate housing 30. The plurality of pawls 24 can be located angularly interposed between adjacent ones of the plurality of first springs 22. The plurality of pawls 24 can be made of a resilient material such as spring steel.

When the clutch 10 is disengaged, axial movement of the reaction plate 12 can compensate for wear of the clutch pack 14. The first springs 22 drive the reaction plate 12 longitudinally to an extended longitudinal position. The locking pawls 24 are automatically engaged in a wedged position with respect to the ring member 36 to prevent axial movement when driven in a clutch load position. The reaction plate is allowed to move axially, in response to the removal of clutch load which automatically disengages the locking pawls 24 from the wedged position with respect to the ring member 36 in response to longitudinal movement urged by the first springs 22. As best illustrated in FIG. 3, the plurality of first springs 22 can preferably be a compression spring for normally biasing the reaction plate 12 outwardly toward the clutch pack 14. The plurality of first springs 22 can be disposed at circumferentially spaced locations between the reaction plate 12 and the back plate housing 30. The reaction plate 12 can move axially with respect to the back plate housing 30. Axial movement of the reaction plate 12 occurs in response to urging of the plurality of first springs 22 in the absence of clutch load force, i.e. when longitudinal movement of the reaction plate 12 is not locked or prevented by the locking pawls 24. The plurality of second springs 26 can be formed as compression springs engageable between the reaction plate 12 and the plurality of pawls 24. The plurality of second springs 26 can engage the plurality of pawls 24 and the reaction plate 12 to automatically cycle between an engaged or locked position and a disengaged or unlocked position with respect to the ring member 36 in response to clutch load force being applied or removed respectively. The locked position of the pawls 24 effectively prevents axial movement of the reaction plate 12 while a clutch load is applied, while the unlocked position of the pawls 24 allows axial movement of the reaction plate 12 when clutch load is absent. In other words, the plurality of pawls 24 can provide for the movement of the reaction plate 12 in a direction opposite from the clutch apply load and towards the clutch pack 14 in the absence of a clutch apply load. The clutch apply load can be applied axially through the clutch pack 14 from the driving shaft 44 and towards the back plate 28. The plurality of pawls 24 can lock against axial movement of the reaction plate 12 in the direction of the clutch apply load and away from the clutch pack 14. The plurality of first springs 22 can be in constant engagement with the reaction plate 12 for biasing the reaction plate 12 toward the clutch pack 14. One or more separation springs (not shown) within the clutch pack provide the biasing force to move the clutch pack from the clutch engaged position to a normally open clutch position. As illustrated in FIG. 3, the plurality of first springs 22 can be supported by the back plate housing 30. To prevent drag and parasitic losses from the constant engagement of the plurality of first springs 22 with the reaction plate 12, the automatic adjustment mechanism 20 can have a positive spring separation force provide by the one or more separation springs (not shown) in the clutch pack, where the spring load from the one or more separation springs has a higher magnitude than the spring load applied to the reaction plate 12 by the plurality of first springs 22.

Each of the plurality of pawls 24 can have a cam surface 40 acting in response to movement of the reaction plate 12 to apply locking force against axial movement with respect to the ring member 36. As best illustrated in FIG. 2, the reaction plate 12 can include surfaces 16 located at circumferentially spaced locations around the reaction plate 12 providing sufficient clearance for pivotal movement of the pawls 24. The surfaces 16 can correspond in number to the plurality of pawls 24. The reaction plate 12 can be fixed in a non-rotatable relationship with respect to the back plate housing 30 while allowing axial movement with respect to the back plate housing 30 through fasteners 42. Each pawl 24 can include the cam surface 40 and a drive arm 38. The drive arm 38 can extend radially outwardly from the common axis shared by the interposed members of the clutch pack 14. The plurality of second springs 26 can bias the plurality of drive arms 38 in a direction axially away from the reaction plate 12 urging movement of the pawls in rotation to drive the plurality of cam surfaces 40 into locking engagement against the ring member 36 to prevent axial movement of the reaction plate 12 in response to a clutch engaged load. The plurality of pawls 24 act in response to urgings provided by the plurality of second springs 26 to lockingly engage the plurality of cam surfaces 40 against the ring member 36 to axially lock the reaction plate 12 in position when subjected to clutch engaged load.

The pawls 24 can rotate to impart movement to the plurality of cam surfaces 40 relative to the surfaces 16 of the reaction plate 12 and ring member 36, such that the reaction plate 12 can be locked against axial movement along the common axis away from the clutch pack 14 when subjected to the clutch engaged load in response to urgings of the plurality of second springs 26 while allowing axial movement toward the clutch pack 14 when not subjected to the clutch engaged load in response to urgings of the plurality of first springs 22. In other words, the cam surface 40 rotates to lock the reaction plate 12 against the ring member 36 in a direction opposing the axially applied clutch load, thereby preventing the axial movement of the reaction plate 12 in response to the axially applied clutch load. The surface 16 allows clearance for rotation of the pawls 24 to bring the cam surface 40 into locking engagement with the ring member 36 in response to urging of the plurality of second springs 26. When the clutch 10 is disengaged, the plurality of first springs 22 can overcome the urging of the plurality of second springs 26 acting between the plurality of drive arms 38 and the reaction plate 12 to rotate the cam surface 40 relative to the surface 16 and ring member 36 in order to allow for axial movement along the common axis to compensate for the axial dimension wear of the interposed members located within the clutch pack 14, thereby providing automatic adjustment of the length of the clutch pack 14 along the common axis. The axial wear or displacement, for which the reaction plate 12 can move to compensate, can occur between any of the interposed members located in the clutch pack 14.

A method of assembling an automatic adjustment mechanism 20 can include positioning the reaction plate 12 such that the reaction plate 12 is normally biased toward the clutch pack 14 and in a direction opposite to an axially applied clutch load. The method can further include inserting the plurality of first springs 22 for normally biasing the reaction plate 12 toward the clutch pack 14. The method can further include assembling the plurality of pawls 24 supported by the reaction plate 12 at equally angularly spaced locations around a periphery of the reaction plate 12 with respect to a common axis of the clutch. The plurality of pawls 24 can act against the ring member 36 in response to urgings of the plurality of second springs 26 to bias the plurality of pawls 24 toward locking engagement of the cam surface 40 with respect to the ring member 36 to lock the reaction plate 12 in axial position opposing axial movement of the reaction plate 12 in response to an applied clutch load. The plurality of pawls 24 can lock against the ring member 36 to prevent axial movement of the reaction plate 12, thereby allowing the reaction plate 12 to oppose or support the clutch apply load. The method can further include inserting the plurality of second springs 26 between the plurality of pawls 24 and the reaction plate 12. The plurality of second springs 26 can normally bias the plurality of pawls 24 to allow for axial movement of the reaction plate 12 toward the clutch pack 14 when not subjected to an applied clutch load, in other words allowing movement in the direction opposite from the clutch apply load. The method can further include applying a positive spring separation force to the automatic adjustment mechanism 20 such that the spring separation force has a higher magnitude than the spring loaded force applied to the reaction plate 12 by the plurality of first springs 22.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In an automatic adjustment mechanism (20) for axially changing a positional relationship between a clutch pack (14) including an array of interposed members having facing surfaces and a clutch actuation mechanism, wherein the automatic adjustment mechanism (20) decreases an axial dimension between adjacent members of the array to compensate for wear of the facing surfaces that occurs when repeatedly engaged and disengaged under a clutch apply load within a self-adjusting clutch (10), the clutch (10) for transmitting power using frictionally engaging members of the clutch pack (14) for securing and releasing driving continuity between a driving shaft (44) and a driven shaft (46), wherein the driving shaft (44) and driven shaft (46) are rotatable about a common axis and support the array of interposed members having facing surfaces spaced along the common axis and co-axial with the driving and driven shafts (44, 46), where some members of the array are constrained to rotate with one of the driving and driven shafts (44, 46) and other members of the array are constrained to rotate with the other of the driving and driven shafts (44, 46) while being movable along the common axis, the clutch actuation mechanism for moving the members toward one another for mutual engagement of the facing surfaces of the members when the clutch (10) is engaged, the improvement comprising:
- a reaction plate (12) normally biased toward the clutch pack (14); and
- a plurality of pawls (24) supported for rotation by the reaction plate (12) for acting against a ring member (36) located coaxial with the common axis and radially adjacent to the reaction plate (12), the plurality of pawls (24) normally biased toward a locking position against the ring member (36) to prevent axial movement of the reaction plate (12) along the common axis in a direction of the clutch apply load, while being movable into a released position with respect to the ring member (36) to allow axial movement of the reaction plate (12) along the common axis in a direction opposite from the clutch apply load in response to removal of the clutch apply load to compensate for any axial dimension wear of the array of interposed members located within the clutch pack (14), thereby providing automatic adjustment of the length of the clutch pack (14) along the common axis.

2. The improvement of claim 1 further comprising:
- a plurality of first springs (22) normally biasing the reaction plate (12) toward the clutch pack (14);
- a plurality of second springs (26) normally biasing the plurality of pawls (24) toward the locking position preventing axial movement of the reaction plate (12) in the direction of the clutch apply load; and
- a separation spring located in the clutch pack with a positive spring separation force having a higher magnitude than a spring load applied to the reaction plate (12) by the plurality of first springs (22).

3. The improvement of claim 2, wherein the plurality of pawls (24) are disposed at circumferentially spaced locations around the reaction plate (12), and wherein the plurality of first springs (22) are disposed at circumferentially spaced locations around the reaction plate (12) and interposed between circumferentially adjacent pawls (24).

4. The improvement of claim 2, wherein the self-adjusting clutch (10) further comprises a back plate (28) including a back plate housing (30) having an inner wall (34) and an outer wall (35), a bearing sleeve (32) located within the inner wall (34) of the back plate (28), and wherein the ring member (36) is radially located between the inner wall (34) and the reaction plate (12), the back plate housing (30) for receiving the reaction plate (12) located between the inner wall (34) and the outer wall (35).

5. The improvement of claim 1 further comprising:
- an electromagnetic clutch actuator (50).

6. The improvement of claim 1, wherein the self-adjusting clutch (10) is a wet clutch.

7. The improvement of claim 1 further comprising:
- the plurality of pawls (24) having a plurality of cam surfaces (40); and
- the reaction plate (12) having a plurality of surfaces (16) providing clearance for rotation of the plurality of pawls (24) with respect to the reaction plate (12), the plurality of cam surfaces (40) rotatable to be engageable with the ring member (36).

8. In an automatic adjustment mechanism (20) for axially changing a positional relationship between a clutch pack (14) including an array of interposed members having facing surfaces and a clutch actuation mechanism, wherein the automatic adjustment mechanism (20) decreases an axial dimension between adjacent members of the array to compensate for wear of the facing surfaces that occurs when repeatedly engaged and disengaged under a clutch apply load within a self-adjusting clutch (10), the clutch (10) for transmitting power using frictionally engaging members of the clutch pack (14) for securing and releasing driving continuity between a driving shaft (44) and a driven shaft (46), wherein the driving shaft (44) and driven shaft (46) are rotatable about a common axis and support the array of interposed members having facing surfaces spaced along the common axis and co-axial with the driving and driven shafts (44, 46), where some members of the array are constrained to rotate with one of the driving and driven shafts (44, (46), and other members of the array are constrained to rotate with the other of the driving and driven shafts (44, 46) while being movable along the common axis, the clutch actuation mechanism for moving the members toward one another for mutual engagement of the facing surfaces of the members when the clutch (10) is engaged, the improvement comprising:
- a reaction plate (12) supported for movement axially toward and away from the clutch pack (14);
- a plurality of first springs (22) biasing the reaction plate (12) toward the clutch pack (14);
- a plurality of pawls (24) supported by the reaction plate (12) for rotation between a locking position and a released position, the plurality of pawls (24) when in the locking position preventing axial movement of the reaction plate (12) along the common axis in a direction of the clutch apply load and when in the released position allowing axial movement of the reaction plate (12) along the common axis in a direction opposite from the clutch apply load to compensate for any axial dimension wear of the interposed members located within the clutch pack (14), thereby providing automatic adjustment of the length of the clutch pack (14) along the common axis;
- a plurality of second springs (26) biasing the plurality of pawls (24) toward the locking position; and
- a separation spring located in the clutch pack with a positive spring separation force having a higher magnitude than a spring load applied to the reaction plate (12) by the plurality of first springs (22).

9. The improvement of claim 8, wherein the self-adjusting clutch (10) further comprises a back plate (28) including a back plate housing (30) having an inner wall (34) and an outer wall (35), a bearing sleeve (32) located within the inner wall (34) of the back plate (28), and a ring member (36) axially engageable between the inner wall (34) and the reaction plate (12), the back plate housing (30) for receiving the reaction plate (12) between the inner wall (34) and the outer wall (35).

10. The improvement of claim 8 further comprising:
- an electromagnetic clutch actuator (50).

11. The improvement of claim 8, wherein the self-adjusting clutch (10) is a wet clutch.

12. The improvement of claim 8 further comprising;
- the plurality of pawls (24) having a plurality of cam surfaces (40); and
- the reaction plate (12) having a plurality of surfaces (16) providing clearance for rotation of the plurality of pawls (24), the plurality of cam surfaces (40) rotatable and engageable with the ring member (36) when the plurality of pawls (24) are in the locking position.

13. The improvement of claim 8, wherein the plurality of pawls (24) are disposed at circumferentially spaced locations around the reaction plate (12), and the plurality of first springs (22) are disposed at circumferentially spaced locations around the reaction plate (12) and interposed between circumferentially adjacent pawls (24).

14. A method of assembling an automatic adjustment mechanism (20), the automatic adjustment mechanism (20) for axially changing a positional relationship between a clutch pack (14) including an array of interposed members having facing surfaces in addition to a clutch actuation mechanism, wherein the automatic adjustment mechanism (20) decreases an axial dimension between adjacent members of the array to compensate for wear of the facing surfaces that occurs when repeatedly engaged and disengaged under load within a self-adjusting clutch (10), the clutch (10) for transmitting power using frictionally engaging members of the clutch pack (14) for securing and releasing driving continuity between a driving shaft (44) and a driven shaft (46), wherein the driving shaft (44) and driven shaft (46) are rotatable about a common axis and support the array of interposed members having facing surfaces spaced along the common axis and co-axial with the driving and driven shafts (44, 46), where some members of the array are constrained to rotate with one of the driving and driven shafts (44, 46) and other members of the array are constrained to rotate with the other of the driving and driven shafts (44, 46) while being movable along the common axis, the clutch actuation mechanism for moving the members toward one another for mutual engagement of the facing surfaces of the members when the clutch (10) is engaged, the method comprising:
    supporting a reaction plate (12) for axial movement toward and away from the clutch pack (14);
    biasing the reaction plate (12) toward the clutch pack (14) with a plurality of first springs (22);
    supporting a plurality of pawls (24) supported by the reaction plate (12) for rotation between a locking position preventing axial movement of the reaction plate (12) along the common axis while subjected to a clutch apply load and a released position allowing axial movement of the reaction plate (12) along the common axis in response to removal of the clutch apply load to compensate for any axial dimension wear of the interposed members located within the clutch pack (14) thereby providing automatic adjustment of the length of the clutch pack (14) along the common axis;
    biasing the plurality of pawls (24) toward the locking position with a plurality of second springs (26) to prevent axial movement of the reaction plate (12) along the common axis when subjected to the clutch apply load; and
    applying a positive spring separation force with a separation spring in the clutch pack having a higher magnitude than a spring load applied to the reaction plate (12) by the plurality of first springs (22).

\* \* \* \* \*